US007059539B2

(12) United States Patent
Steingass et al.

(10) Patent No.: US 7,059,539 B2
(45) Date of Patent: Jun. 13, 2006

(54) MOTORIZED/MANUAL MONITOR LIFT

(75) Inventors: Robert W. Steingass, Valparaiso, IN (US); Stewart G. McMillan, Valparaiso, IN (US); Larry Shepard, Kentland, IN (US)

(73) Assignee: Task Force Tips Inc., Valparaiso, IN (US)

( * ) Notice: Subject to any disclaimer, the term of this patent is extended or adjusted under 35 U.S.C. 154(b) by 69 days.

(21) Appl. No.: 10/743,993

(22) Filed: Dec. 23, 2003

(65) Prior Publication Data

US 2005/0133618 A1 Jun. 23, 2005

(51) Int. Cl.

*A01G 25/06* (2006.01)
*B05B 15/10* (2006.01)
*E01H 3/04* (2006.01)
*A62C 35/02* (2006.01)
*A62C 25/00* (2006.01)

(52) U.S. Cl. ...................... 239/203; 239/200; 239/201; 239/202; 239/210; 169/52; 169/24; 169/67

(58) Field of Classification Search ................ 239/203, 239/200, 201, 202, 210, 532, 320, 329; 138/114, 138/43; 285/302, 303; 169/52, 24, 67
See application file for complete search history.

(56) References Cited

U.S. PATENT DOCUMENTS 2,968,440 A * 1/1961 Cone .......................... 239/203
3,684,179 A * 8/1972 Fischer et al. .............. 239/203
3,770,062 A 11/1973 Riggs
3,776,463 A * 12/1973 Dyck ......................... 239/204
3,847,392 A * 11/1974 Horwinski .................. 285/302
4,071,266 A * 1/1978 Mountford ................... 285/14
4,099,670 A * 7/1978 Cole et al. .................. 239/205
4,274,592 A * 6/1981 Westhusin .................. 239/200
5,133,501 A * 7/1992 Marshall ..................... 239/201
5,160,174 A * 11/1992 Thompson ................... 285/32
6,109,360 A 8/2000 Mandzukic et al.

OTHER PUBLICATIONS

Task Force Tips, Inc; Extend-A-Gun Model XG12 Installation and Operating Instructions; Oct. 24, 2002; 12 pages; Task Force Tips, Inc.; Valparaiso, Indiana.
Task Force Tips, Inc.; Extend-A-Gun Model XG 18 Installation and Operating Instructions; Oct. 28, 2002; 12 pages; Task Force Tips, Inc.; Valparaiso, Indiana.

* cited by examiner

*Primary Examiner*—Davis Hwu
(74) *Attorney, Agent, or Firm*—Wallenstein Wagner & Rockey, Ltd.

(57) ABSTRACT

A telescoping waterway for adjusting the height of a firefighting monitor is disclosed. The telescoping waterway includes a hollow outer tube, a hollow inner tube within the hollow outer tube, and an actuator that moves the hollow inner tube relative to the hollow outer tube, wherein the hollow inner tube can be maintained in at least one intermediate position between a retracted position and a fully extended position.

28 Claims, 7 Drawing Sheets

MOTORIZED/MANUAL MONITOR LIFT

TECHNICAL FIELD OF THE INVENTION

The present invention relates to the field of firefighting monitor lifts. Particularly, the present invention relates to a motorized and/or manual firefighting monitor lift for adjusting the height of a firefighting monitor mounted on a fire truck that can be safely maintained and used in intermediate positions.

BACKGROUND OF THE INVENTION

Most fire trucks include a firefighting monitor usually mounted on the deck of the truck, which can be used to fight large building or high-rise fires, or in other situations in which a large amount of water pressure is needed. A firefighting monitor is a conduit that is supplied with fluid (usually water) at the inlet and has a nozzle at the discharge end. The monitor's primary purpose is to allow the pressurized fluid exiting the nozzle to be redirected in both elevation and azimuth angles and then remain pointed at the desired target. Firefighting monitors can be mounted anywhere on the fire truck deck, but they are most commonly mounted behind the cab. As fire trucks become larger and include more equipment, it has become difficult to mount the firefighting monitor in a position such that no part of the truck interferes with the flow of water from the firefighting monitor. In response to this problem, hydraulic and manual firefighting monitor lifts have been manufactured. These lifts are mounted directly on the fire truck, and can be used to raise and lower the firefighting monitor in order to clear the high points of the truck. However, there are numerous problems with existing manual and hydraulic lifts.

Manual lifts are dangerous because they require the firefighter to climb onto the deck of the fire truck. In winter, this is particularly dangerous, since the truck deck may be icy. Fire truck decks can sit as high as nine feet off of the ground. Therefore, the potential for serious injury to the firefighter is great in this situation. Moreover, in order to raise the manual lift, the firefighter must be able to unlatch the locking mechanism that secures the firefighting monitor in place with one hand, and lift the firefighting monitor at the same time with the other hand. Once the manual lift has been fully raised, it can be locked into position. Then, to lower the manual lift, the firefighter must reverse the process. If the firefighter is for any reason unable to support the entire weight of the firefighting monitor after unlatching the device for lowering, the firefighting monitor can fall abruptly and cause injury to the firefighter. Additionally, existing manual lifts may only be used in either the fully extended or the fully retracted positions. They may not be used in intermediate positions.

Like the manual lifts, hydraulic lifts can only be used in either the fully extended or the fully retracted positions. They can also become stuck in these positions. If the hydraulics break down when the firefighting monitor is retracted, the firefighting monitor cannot be raised until the problem is fixed. Typically, this renders the firefighting monitor useless, since it was most likely installed to increase the height of the firefighting monitor to avoid some obstruction on the truck itself. Similarly, if the hydraulics break down when the firefighting monitor is in the extended position, the problem may have to be fixed before the fire truck can be pulled back into the firehouse garage. If the hydraulics break down when the firefighting monitor is somewhere in between the fully extended and retracted positions, the firefighting monitor could either be stuck in that position, or it may rapidly or slowly return to its retracted position. Many hydraulic lifts also develop leaks over time, making the entire system less effective or inoperable. The present invention seeks to solve these and other problems.

SUMMARY OF THE INVENTION

One aspect of the present invention provides a telescoping waterway for raising and lowering a firefighting monitor comprising a hollow outer tube and a hollow inner tube within the hollow outer tube. An actuator moves the hollow inner tube relative to the hollow outer tube, wherein the hollow inner tube can be maintained in at least one intermediate position between a retracted position and a fully extended position.

Another aspect of the present invention provides that the actuator comprises an internally-threaded nut positioned at the top of the hollow outer tube, and a threaded outer wall of the hollow inner tube, wherein the threaded outer wall engages the internally-threaded nut. A drive mechanism is operably connected to the internally-threaded nut.

A further aspect of the present invention provides a drive motor coupled to the drive mechanism for automatically raising and lowering the hollow inner tube.

Yet a further aspect of the present invention provides a hand crank coupled to the drive mechanism for manually raising and lowering the hollow inner tube.

Still a further aspect of the present invention provides a drive motor coupled to the drive mechanism for automatically raising and lowering the hollow inner tube, and a hand crank coupled to the drive mechanism for manually raising and lowering the hollow inner tube.

Yet a further aspect of the present invention provides that the drive motor is mounted on one side of the drive mechanism, and the hand crank is mounted on the other side of the drive mechanism.

Still a further aspect of the present invention provides that the drive mechanism comprises a top surface and a bottom surface, wherein the drive motor is mounted either on the top surface or the bottom surface of the drive mechanism, and the hand crank is mounted on the other of the top surface or the bottom surface of the drive mechanism.

Yet a further aspect of the present invention provides that the actuator comprises a gear, and a toothed portion on the outer wall of the hollow inner tube, wherein the toothed portion engages the gear.

Still a further aspect of the present invention provides a drive motor coupled to the gear for automatically raising and lowering the hollow inner tube.

Yet a further aspect of the present invention provides a hand crank coupled to the gear for manually raising and lowering the hollow inner tube.

Still a further aspect of the present invention provides a drive motor coupled to the gear for automatically raising and lowering the hollow inner tube, and a hand crank coupled to the gear for manually raising and lowering the hollow inner tube.

Yet a further aspect of the present invention provides that the drive motor is mounted on one side of the gear, and the hand crank is mounted on the other side of the gear.

Still a further aspect of the present invention provides a telescoping waterway for raising and lowering a firefighting monitor comprising a hollow outer tube, and an internally-threaded nut positioned at the top of the hollow outer tube. A hollow inner tube is disposed within the hollow outer tube.

The hollow inner tube comprises a threaded outer wall that engages the internal threading of the nut to allow relative movement between the hollow inner tube and the hollow outer tube.

Yet a further aspect of the present invention provides a drive mechanism operably connected to the internally-threaded nut.

Still a further aspect of the present invention provides a drive motor coupled to the drive mechanism for automatically raising and lowering the hollow inner tube.

Yet a further aspect of the present invention provides that the drive motor is an electric gear motor powered by a fire truck electrical system.

Still a further aspect of the present invention provides a hand crank coupled to the drive mechanism for manually raising and lowering the hollow inner tube.

Yet a further aspect of the present invention provides that the hollow outer tube is mounted on a fire truck deck.

Still a further aspect of the present invention provides a drive mechanism operably connected to the internally-threaded nut, the drive mechanism comprising a top surface and a bottom surface. There is a drive motor coupled to the drive mechanism for automatically raising and lowering the hollow inner tube, and a hand crank coupled to the drive mechanism for manually raising and lowering the hollow inner tube.

Yet a further aspect of the present invention provides that the drive motor is mountable either above or below the drive mechanism. The hand crank is mounted (a) above the drive mechanism, when the drive motor is mounted below the drive mechanism; and (b) below the drive mechanism, when the drive motor is mounted above the drive mechanism.

Still a further aspect of the present invention provides that the drive motor is mountable either on the top surface or on the bottom surface of the drive mechanism. The hand crank is mounted (a) on the top surface of the drive mechanism, when the drive motor is mounted on the bottom surface of the drive mechanism; and (b) on the bottom surface of the drive mechanism, when the drive motor is mounted on the top surface of the drive mechanism.

DETAILED DESCRIPTION OF A PREFERRED EMBODIMENT OF THE INVENTION

This invention is susceptible of embodiment in many different forms. The specification and drawings describe and depict a preferred embodiment of the invention in detail. This disclosure is to be considered as one example of the invention. This disclosure is not intended to limit the broad aspect of the invention to the embodiments illustrated.

Figure 1:
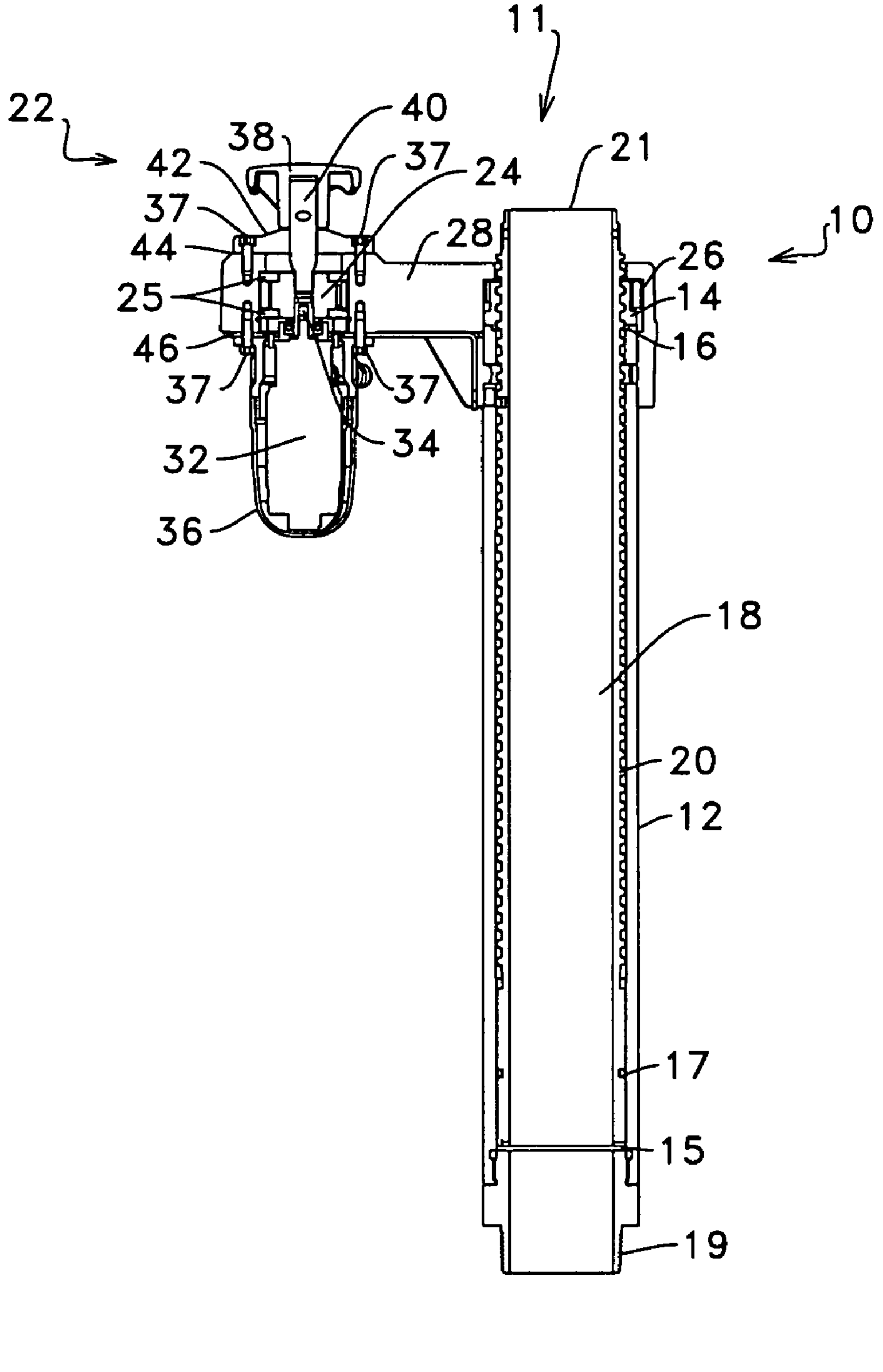
FIG. 1 is a sectional view of a telescoping waterway with a hand crank and a drive motor.
Figure 2:
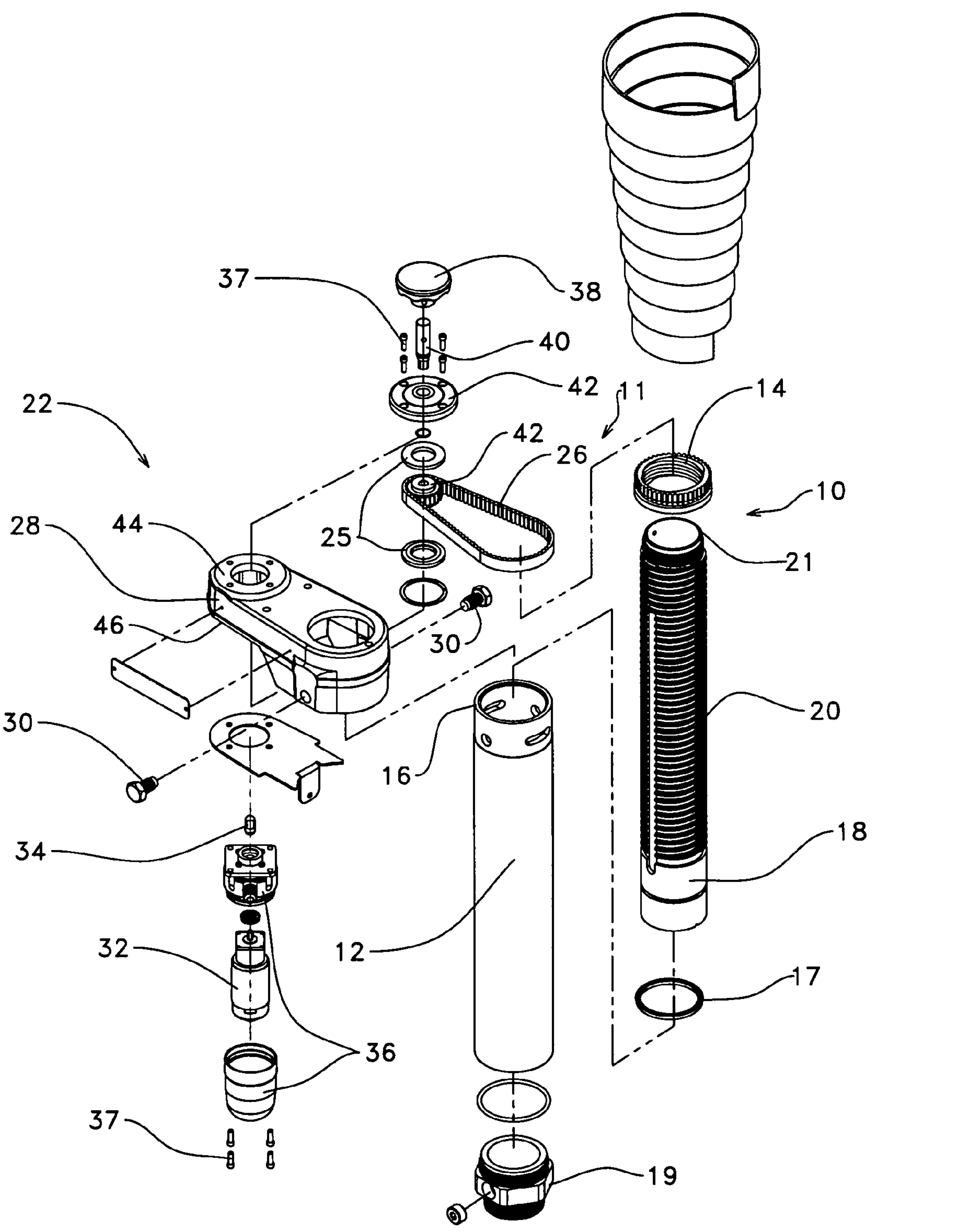
FIG. 2 is an exploded view of the telescoping waterway of FIG. 1, with a hand crank and a drive motor.

Referring to the drawings, FIGS. 1 and 2 show a telescoping waterway 10 for raising and lowering a firefighting monitor. The telescoping waterway 10 has a hollow outer tube 12 with an inlet end 19 and a top end 16. The inlet end 19 is connectable to a fluid source. There is a hollow inner tube 18 positioned within the hollow outer tube 12, so that fluid can enter through the inlet end 19, and pass unobstructed through the telescoping waterway 10 to an outlet end 21 of the hollow inner tube 18. The outlet end 21 of the hollow inner tube 18 is connectable to an inlet of a firefighting monitor, so that fluid exiting the telescoping waterway 10 flows into the firefighting monitor.

Figure 3:
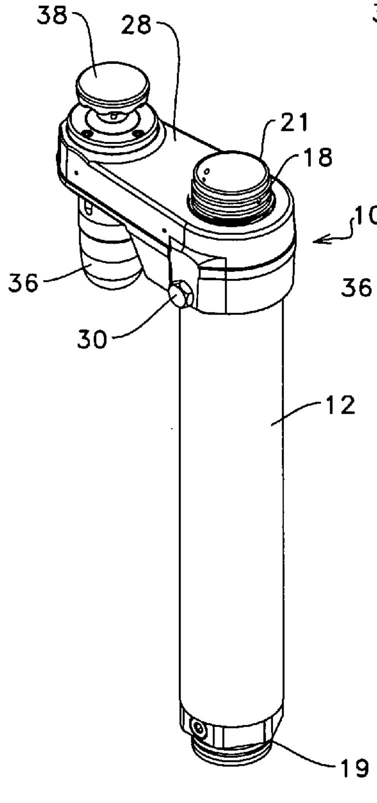
FIG. 3 is a perspective view of the telescoping waterway of FIGS. 1 and 2 in a retracted position.
Figure 4:
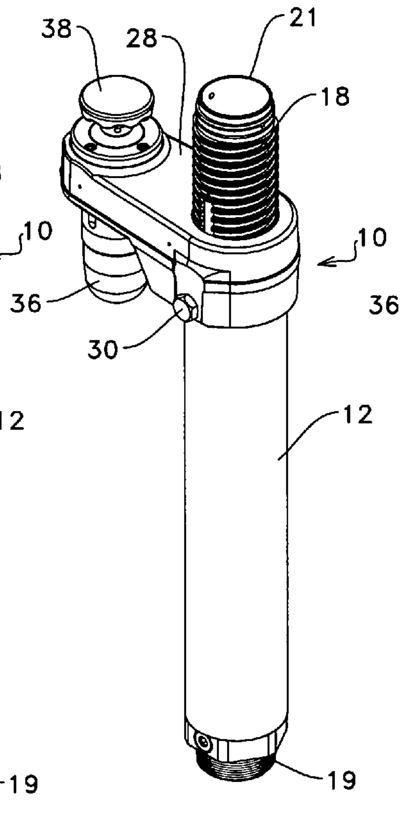
FIG. 4 is a perspective view of the telescoping waterway of FIGS. 1 and 2 in an intermediate position.
Figure 5:
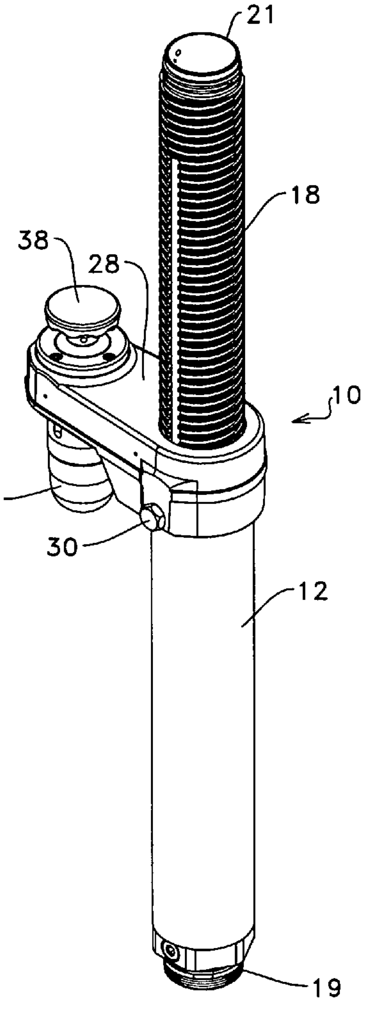
FIG. 5 is a perspective view of the telescoping waterway of FIGS. 1 and 2 in a fully extended position.

An actuator 11 moves the hollow inner tube 18 relative to the hollow outer tube 12. In FIG. 1, the actuator 11 includes an internally-threaded nut 14 positioned at the top end 16 of the hollow outer tube 12. For purposes of this disclosure, positioned at the top end 16 of the hollow outer tube 12 means that the internally-threaded nut 14 is positioned near the top or at the top of the hollow outer tube 12. The internally-threaded nut 14 may be a rotating nut, a ring gear or any similar type part. The hollow inner tube 18 has a threaded outer wall 20 that engages the internal threading of the nut 14 to allow relative movement between the hollow inner tube 18 and the hollow outer tube 12. The threaded design of the actuator 11 prevents the firefighting monitor from extending when water pressure is applied or increased, and also prevents the firefighting monitor from falling when water pressure is removed or decreased. The strength of the threads holds the device in place when it is in a retracted position, a fully extended position, or anywhere in between, i.e., in an intermediate position. FIG. 3 shows the telescoping waterway 10 in a retracted position, FIG. 4 shows the telescoping waterway 10 in an intermediate position, and FIG. 5 shows the telescoping waterway 10 in a fully extended position. All of the positions shown in FIGS. 3–5 can be safely maintained during ordinary use of the firefighting monitor due to the strength of the threads.

An O-ring 15 is positioned within the hollow outer tube 12 just above the inlet end 19 to prevent fluid leakage. A seal is formed between the hollow inner tube 18 and the hollow outer tube 12 to prevent fluid leakage using a cup seal 17. The cup seal 17 is positioned around the outside of the hollow inner tube 18 such that a seal is formed between the hollow inner tube 18 and the hollow outer tube 12, but relative movement between the hollow inner tube 18 and the hollow outer tube 12 is still permitted.

A drive mechanism 22 is operably connected to the internally-threaded nut 14. Any kind of drive mechanism 22 may be used. The drive mechanism 22 shown in FIGS. 1 and 2 comprises a drive gear 24 that rests in a pair of keeper bearings 25 and turns a drive belt 26. The drive belt 26 has a serrated inner surface, which cooperates with a complementary serrated outer surface of the internally-threaded nut 14 and the drive gear 24. Therefore, when the drive gear 24 turns, the drive belt 26 rotates the internally-threaded nut 14, moving the hollow inner tube 18 up or down. The drive mechanism 22 is housed in a drive housing 28 that is secured to the hollow outer tube 12. The drive housing 28 may be secured using any known securing means, but is preferably secured with a pair of stop bolts 30.

The telescoping waterway 10 can be mounted anywhere on or in a fire truck, but is preferably mounted in a place where the firefighting monitor can be operated with 360 degrees of azimuth freedom when the telescoping waterway 10 is in its fully extended position. The telescoping waterway 10 is preferably mounted where there are adequate structural supports to counteract the nozzle reaction loads transmitted to the telescoping waterway 10 which could be in excess of 1000 lbf. The mounting is preferably proximate the pump discharge manifold to facilitate interconnection of the plumbing to the inlet end 19 of the telescoping waterway 10. The hollow outer tube 12 can be mounted on a fire truck deck, and bolted in place using U-bolts, or any other sufficiently strong securing means.

A drive motor 32 may be coupled to the drive mechanism 22 for automatically raising and lowering the hollow inner tube 18. In FIGS. 1 and 2, the drive motor 32 is coupled to the drive mechanism 22 by way of a motor adapter 34 that mates with the drive gear 24. The drive motor 32 is preferably an electric gear motor housed inside a motor housing 36 that can be mounted using screws 37. The drive motor 32 is preferably either a 12 volt or a 24 volt DC gear motor that is powered by a fire truck's electrical system. The drive motor 32 may be powered by any known power source including, but not limited to, AC, DC, battery, fuel cell, or solar power.

A hand crank 38 may also be coupled to the drive mechanism 22 for manually raising and lowering the hollow inner tube 18. In FIGS. 1 and 2, the hand crank 38 is coupled to the drive mechanism 22 by way of a shaft 40 that mates with the drive gear 24. The hand crank 38 and the shaft 40 fit with a cap 42 that can be mounted using screws 37. FIGS. 1–5 and 9 show embodiments with the drive motor 32 coupled to the drive mechanism 22 for automatically raising and lowering the hollow inner tube 18, and the hand crank 38 coupled to the drive mechanism 22 for manually raising and lowering the hollow inner tube 18. In these embodiments, the hand crank 38 acts as a back-up or manual override in case the drive motor 32 is not working, for example, in the event that there is no power or the drive motor 32 breaks down. Both the drive motor 32 and the hand crank 38 allow an operator to raise and lower the hollow inner tube 18 remotely, i.e., without physically climbing on the fire truck deck. Remote control of the firefighting monitor height saves time in an emergency and helps to ensure the safety of the operator.

Figure 9:
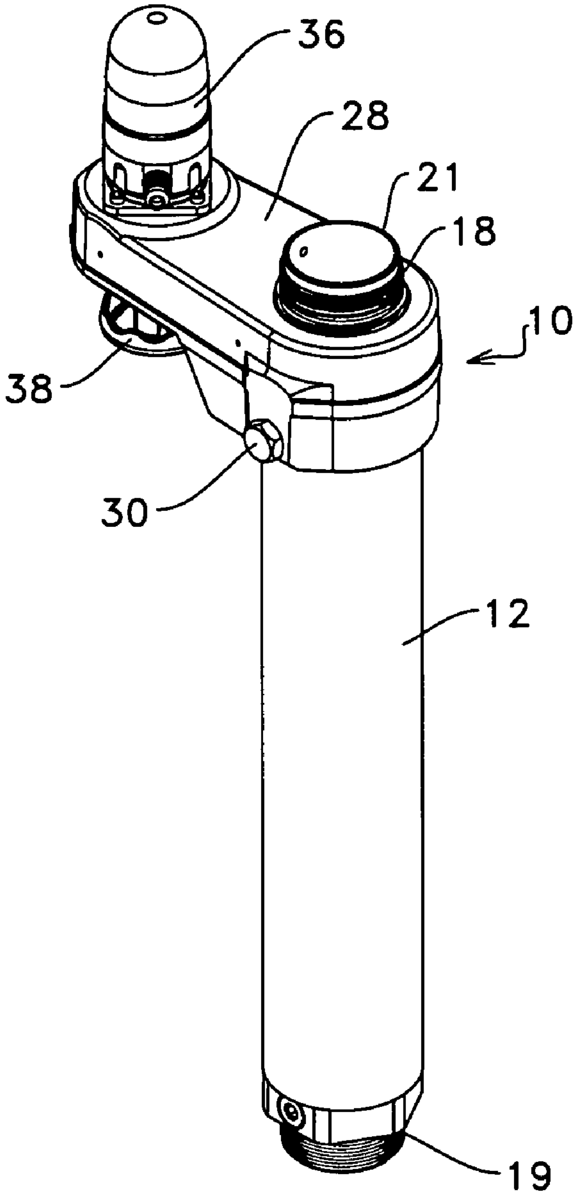
FIG. 9 is a perspective view of a telescoping waterway with both a drive motor and a hand crank.

The drive mechanism 22 has a top surface 44 and a bottom surface 46. The drive motor 32 and the hand crank 38 are mountable using screws 37 either on the top surface 44 or the bottom surface 46 of the drive mechanism 22 according to the preference of the firefighter or to complement the configuration of the fire truck. Optionally, the drive motor 32 and the hand crank 38 are mounted opposite each other, one on either side of the drive mechanism 22, or one on or above the top surface 44 of the drive mechanism 22, and the other on or below the bottom surface 46 of the drive mechanism 22. This is preferable since both the drive motor 32 and the hand crank 38 need to be operably connected to the drive gear 24 in order for each to be able to raise and lower the hollow inner tube 18. Therefore, if the drive motor 32 is mounted above the drive mechanism 22, the hand crank 38 is preferably mounted below the drive mechanism 22. The reverse is also true, so that if the drive motor 32 is mounted below the drive mechanism 22, the hand crank 38 is preferably mounted above the drive mechanism 22. In FIG. 1, the hand crank 38 is mounted on the top surface 44 of the drive mechanism 22, and the drive motor 32 is mounted on the bottom surface 46 of the drive mechanism 22. In FIG. 9, the drive motor 32 is mounted on the top surface 44 of the drive mechanism 22 and the hand crank 38 is mounted on the bottom surface 46 of the drive mechanism 22. If the drive mechanism 22 is flush with the fire truck deck, the drive motor 32 can be mounted below, if there is room. Then, the hand crank 38 can be mounted above the drive mechanism 22, where it can be easily reached by an operator's hand. If not, the drive motor 32 can be mounted above the drive mechanism 22, and the hand crank 38 below, since the drive motor 32 typically takes up more room than the hand crank 38. If the hand crank 38 is mounted below the drive mechanism 22, there needs to be enough room for a user to reach the hand crank 38 and be able to turn it in the clockwise and counter-clockwise directions.

Figure 6:
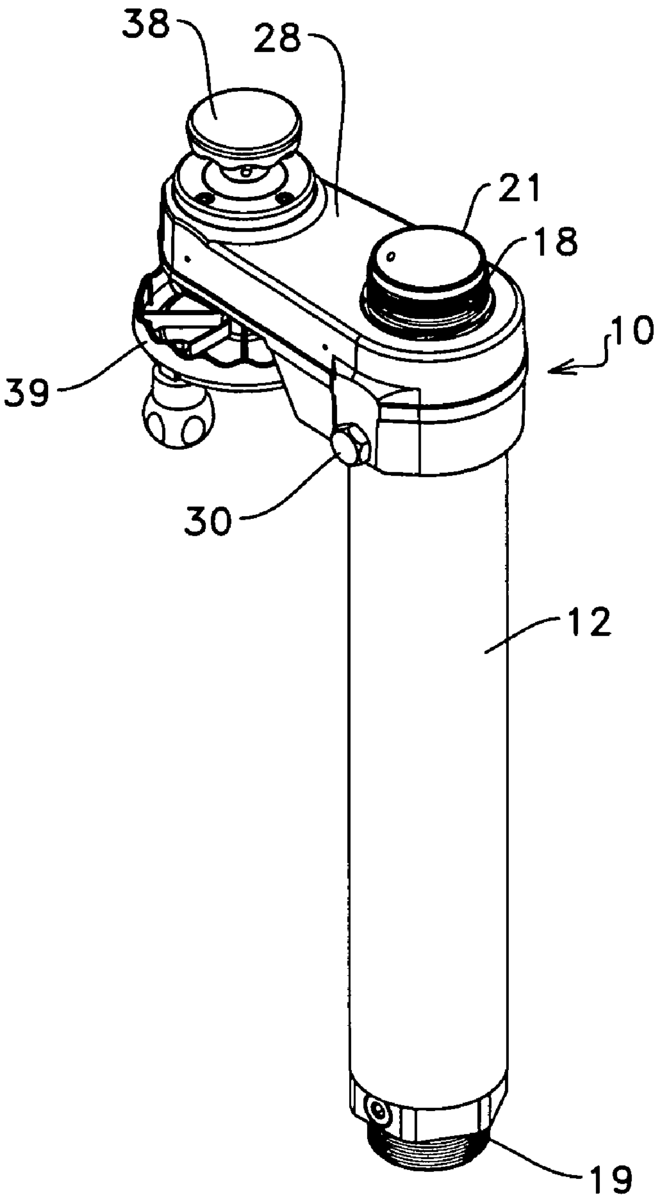
FIG. 6 is a perspective view of a telescoping waterway with two different kinds of hand cranks.
Figure 7:
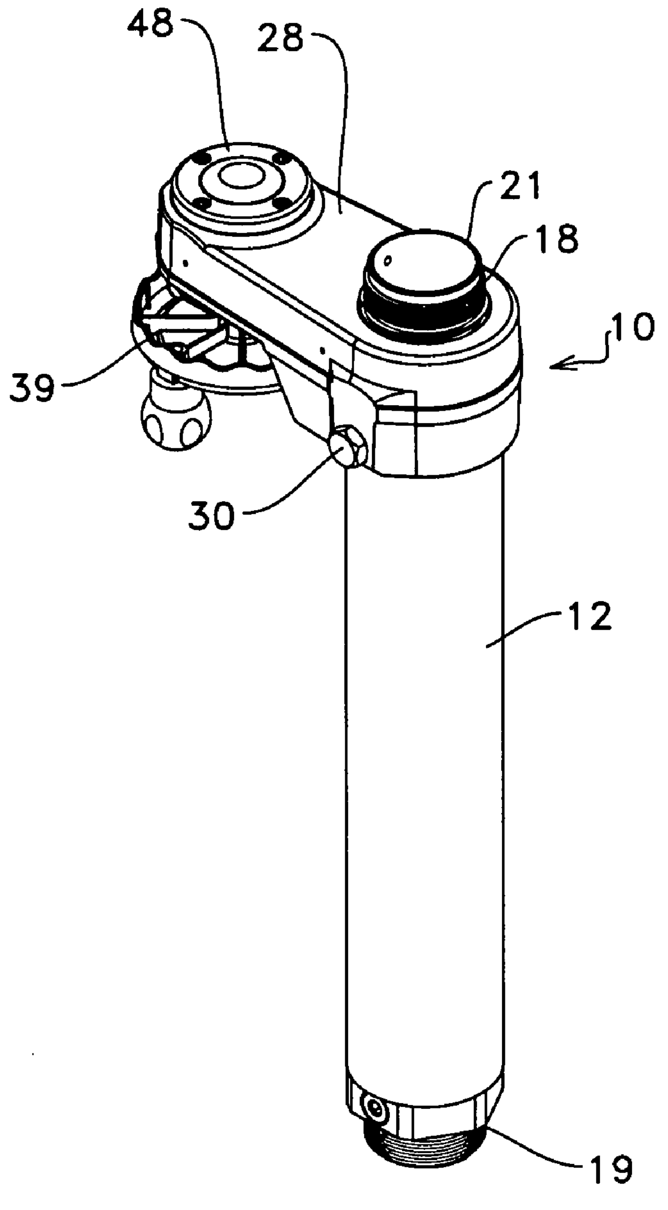
FIG. 7 is a perspective view of a telescoping waterway with only a hand crank.
Figure 8:
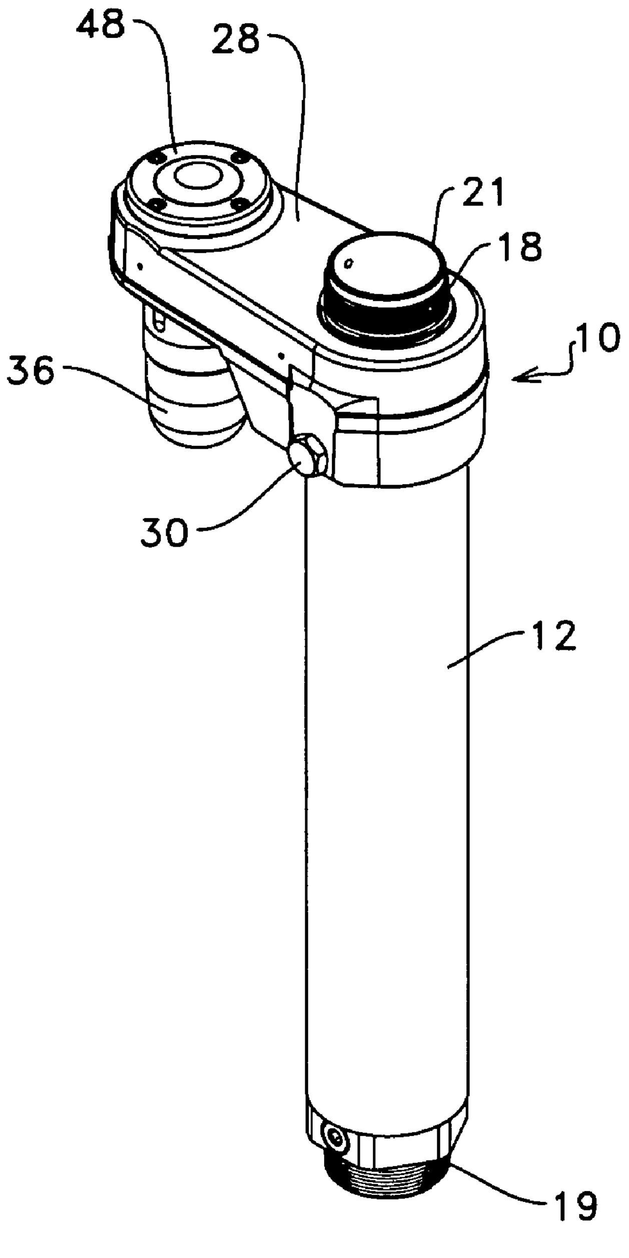
FIG. 8 is a perspective view of a telescoping waterway with only a drive motor.

It is also contemplated that the telescoping waterway 10 may have two different kinds of hand cranks 38 and 39, as shown in FIG. 6. One hand crank 38 may be mounted above the drive mechanism 22, the other hand crank 39 below the drive mechanism 22. Further, it is contemplated that the telescoping waterway 10 may have one hand crank 39 and a cover plate 48 on the other side, as shown in FIG. 7, or one drive motor 32 and a cover plate 48 on the other side, as shown in FIG. 8. Though not shown in the Figures, it is also contemplated that the telescoping waterway 10 may have two drive motors 32, one mounted above the drive mechanism 22, the other mounted below the drive mechanism 22, in case one drive motor 32 breaks down, or a more powerful drive is needed. It is further contemplated that the drive motors 32, the hand cranks 38, 39, and the cover plates 48 are removable and interchangeable, so that any one can be easily replaced with the same part or a different part, without taking the whole fire truck apart. For example, if the drive motor 32 of FIG. 8 breaks down, either the broken drive motor 32 or the cover plate 48 can quickly be removed and replaced with another working drive motor 32 or a hand crank 38, 39.

Though not shown in the drawings, it is further contemplated that instead of the threaded design discussed above, the actuator 11 can include one or more gears, and a complementary toothed portion on the outer wall of the hollow inner tube 18, wherein the toothed portion engages the one or more gears. As with the threaded design, the gear and tooth design of the actuator 11 prevents the firefighting monitor from extending when water pressure is applied or increased, and also prevents the firefighting monitor from falling when water pressure is removed or decreased. The strength of the gear and tooth arrangement holds the device in place when it is in a retracted position, an intermediate position, or a fully extended position. The drive motor 32 and/or the hand crank 38, 39 may be coupled to the one or more gears for automatically and/or manually raising and lowering the hollow inner tube 18. Optionally, the drive motor 32 is mounted on one side of the gear(s), and the hand crank 38, 39 is mounted on the other side of the gear(s).

It is still further contemplated that the actuator 11 may be any mechanical device that moves the hollow inner tube 18 relative to the hollow outer tube 12, and maintains the hollow inner tube 18 in at least one intermediate position between a retracted position and a fully extended position. Such actuators 11 include, but are not limited to, any one or a combination of the following: a drive pinion driving rack teeth on the outside of the hollow inner tube 18, a drive sprocket and drive chain driving a hollow sprocket that engages with threads on the outside of the hollow outer tube 12, and a drive belt or drive chain rotating a re-circulating ball nut engaged with re-circulating balls onto ball screw threads on the outside of the hollow inner tube 18.

Given all of the above options, the telescoping waterway 10 of the present invention is intended to meet the needs of different users with different fire-fighting needs, and to be adaptable to any type of fire truck. It will be understood that, given the above description of the embodiments of the invention, various modifications may be made by one skilled in the art. Such modifications are intended to be encompassed by the claims below.

What is claimed is:

1. A telescoping waterway for raising and lowering a firefighting monitor comprising:

a hollow outer tube;

an internally-threaded, rotatably-driven nut positioned at the top of the hollow outer tube; and, a hollow inner tube within the hollow outer tube, the hollow inner tube comprising a threaded outer wall engaging the internally-threaded nut to cause relative axial movement between the hollow inner tube and the hollow outer tube.

2. The telescoping waterway of claim 1 further comprising:

a drive mechanism integral with and operably connected to the internally-threaded nut.

3. The telescoping waterway of claim 2 further comprising:

a drive motor coupled to the drive mechanism for automatically raising and lowering the hollow inner tube.

4. The telescoping waterway of claim 3, wherein the drive motor is an electric gear motor powered by a fire truck electrical system.

5. The telescoping waterway of claim 2 further comprising:

a hand crank coupled to the drive mechanism for manually raising and lowering the hollow inner tube.

6. The telescoping waterway of claim 2, wherein the hollow outer tube is mounted on a fire truck deck.

7. The telescoping waterway of claim 1 further comprising:

a drive mechanism operably connected to the internally-threaded nut, the drive mechanism comprising a top surface and a bottom surface;

a drive motor coupled to the drive mechanism for automatically raising and lowering the hollow inner tube; and, a hand crank coupled to the drive mechanism for manually raising and lowering the hollow inner tube.

8. The telescoping waterway of claim 7, wherein the drive motor is an electric gear motor powered by a fire truck electrical system.

9. The telescoping waterway of claim 7, wherein the hollow outer tube is mounted on a fire truck deck.

10. The telescoping waterway of claim 7, wherein the drive motor is mounted either above or below the drive mechanism, and the hand crank is mounted on the other of above or below the drive mechanism.

11. The telescoping waterway of claim 7, wherein the drive motor is mounted either on the top surface or the bottom surface of the drive mechanism, and the hand crank is mounted on the other of the top surface or the bottom surface of the drive mechanism.

12. The telescoping waterway of claim 1, wherein the internally-threaded nut comprises a re-circulating ball nut with re-circulating balls engaging the threaded out wall of the hollow inner tube.

13. A telescoping waterway comprising:

a hollow outer tube;

a hollow inner tube within the hollow outer tube;

an actuator that moves the hollow inner tube relative to the hollow outer tube, wherein the hollow inner tube can be maintained in at least one intermediate position between a retracted position and a fully extended position, the actuator comprising a threaded outer wall of the hollow inner tube, wherein the threaded outer wall engages the internally-threaded nut and a drive mechanism integral with and operably connected to the internally-threaded nut; and, an internally-threaded, rotatably-driven nut positioned at the top of the hollow outer tube.

14. The telescoping waterway of claim 13 further comprising:

a drive motor coupled to the drive mechanism for automatically raising and lowering the hollow inner tube.

15. The telescoping waterway of claim 14, wherein the drive motor is an electric gear motor powered by a fire truck electrical system.

16. The telescoping waterway of claim 13 further comprising:

a hand crank coupled to the drive mechanism for manually raising and lowering the hollow inner tube.

17. The telescoping waterway of claim 13 further comprising:

a drive motor coupled to the drive mechanism for automatically raising and lowering the hollow inner tube; and, a hand crank coupled to the drive mechanism for manually raising and lowering the hollow inner tube.

18. The telescoping waterway of claim 17, wherein the drive motor is an electric gear motor powered by a fire truck electrical system.

19. The telescoping waterway of claim 17, wherein the drive motor is mounted on one side of the drive mechanism, and the hand crank is mounted on the other side of the drive mechanism.

20. The telescoping waterway of claim 17, the drive mechanism comprising:

a top surface and a bottom surface, wherein the drive motor is mounted either on the top surface or the bottom surface of the drive mechanism, and the hand crank is mounted on the other of the top surface or the bottom surface of the drive mechanism.

21. The telescoping waterway of claim 13, wherein the internally-threaded nut comprises a re-circulating ball nut with re-circulating balls engaging the threaded out wall of the hollow inner tube.

22. A telescoping waterway for raising and lowering a firefighting monitor comprising:

a hollow outer tube;

a hollow inner tube within the hollow outer tube;

an actuator that moves the hollow inner tube relative to the hollow outer tube, wherein the hollow inner tube can be maintained in at least one intermediate position between a retracted position and a fully extended position, the actuator further comprising:

a gear; and, a toothed portion on the outer wall of the hollow inner tube, wherein the toothed portion engages the gear.

23. The telescoping waterway of claim 22 further comprising:

a drive motor coupled to the gear for automatically raising and lowering the hollow inner tube.

24. The telescoping waterway of claim 23, wherein the drive motor is an electric gear motor powered by a fire truck electrical system.

25. The telescoping waterway of claim 22 further comprising:

a hand crank coupled to the gear for manually raising and lowering the hollow inner tube.

26. The telescoping waterway of claim 22 further comprising:

a drive motor coupled to the gear for automatically raising and lowering the hollow inner tube; and, a hand crank coupled to the gear for manually raising and lowering the hollow inner tube.

27. The telescoping waterway of claim 26, wherein the drive motor is an electric gear motor powered by a fire truck electrical system.

28. The telescoping waterway of claim 26, wherein the drive motor is mounted on one side of the gear, and the hand crank is mounted on the other side of the gear.

* * * * *